United States Patent
Tong et al.

(10) Patent No.: US 7,390,067 B2
(45) Date of Patent: Jun. 24, 2008

(54) APPARATUS AND METHODS FOR WHEEL BALANCING VIA ROTOR DRIVE KEYS

(75) Inventors: Lei Tong, South Bend, IN (US); Jon T. Beehler, Bremen, IN (US); James R. Bunton, New Carlisle, IN (US); John R. Vance, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 260 days.

(21) Appl. No.: 11/399,119

(22) Filed: Apr. 5, 2006

(65) Prior Publication Data

US 2007/0236076 A1 Oct. 11, 2007

(51) Int. Cl.
*B60B 19/00* (2006.01)
*F16D 55/36* (2006.01)

(52) U.S. Cl. ............... 301/6.2; 301/6.91; 188/71.5
(58) Field of Classification Search ............... 301/5.21, 301/6.1, 6.2, 6.91; 188/71.5, 71.6, 18 A, 188/264 R
See application file for complete search history.

(56) References Cited

U.S. PATENT DOCUMENTS

| | | | |
|---|---|---|---|
| 2,990,216 A | 6/1961 | Albright et al. | |
| 3,836,201 A | 9/1974 | Stimson et al. | |
| 3,958,833 A | 5/1976 | Stanton | |
| 4,218,097 A | 8/1980 | Olinger et al. | |
| 5,024,297 A | 6/1991 | Russell | |
| 5,186,521 A | 2/1993 | Niespodziany et al. | |
| 5,310,025 A | 5/1994 | Anderson | |
| 5,851,056 A | 12/1998 | Hyde | |
| 5,931,269 A | 8/1999 | Detwiler et al. | |
| 6,003,954 A | 12/1999 | Everhard et al. | |
| 2003/0102710 A1 | 6/2003 | Thorp et al. | |
| 2005/0264090 A1 | 12/2005 | Kaczynski et al. | |
| 2006/0006729 A1 | 1/2006 | Rutten | |

FOREIGN PATENT DOCUMENTS

EP 1842693 * 10/2007 ............... 301/6.2

* cited by examiner

*Primary Examiner*—Jason R Bellinger
(74) *Attorney, Agent, or Firm*—Birch, Stewart, Kolasch & Birch, LLP

(57) ABSTRACT

Apparatus and methods to balance a wheel which rotates around an axle. The wheel has a rim having an outer surface and an opposite interior surface positioned circumferentially around the axle. A plurality of rotor drive keys are mounted at the interior surface of the rim. At least one rotor drive key having a different weight than the other rotor drive keys is mounted approximately opposite an abnormal weight in order to balance the wheel.

17 Claims, 5 Drawing Sheets

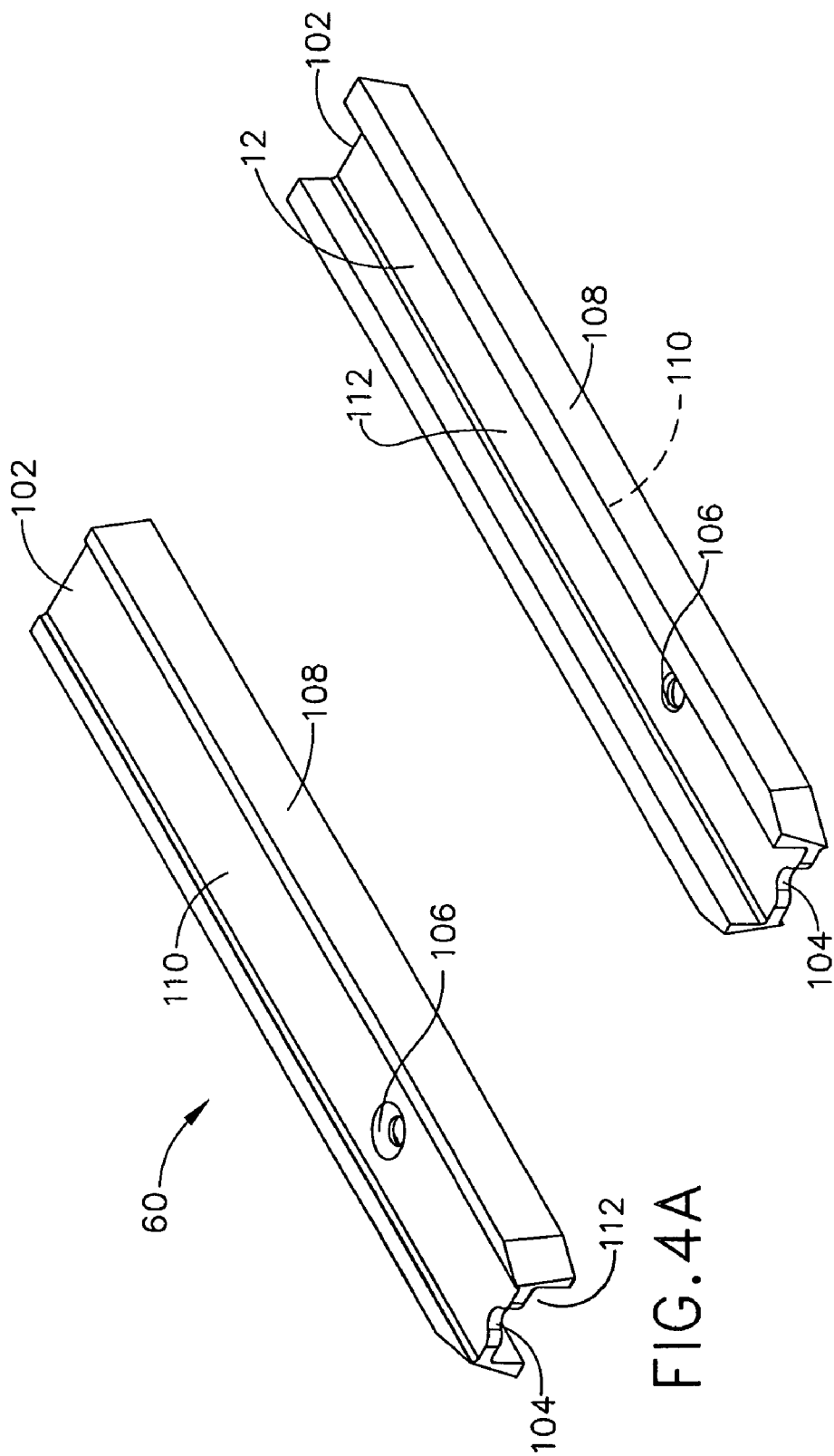

APPARATUS AND METHODS FOR WHEEL BALANCING VIA ROTOR DRIVE KEYS

TECHNICAL FIELD

The present disclosure pertains to wheels, and more particularly, to an apparatus and methods to balance a wheel via at least one rotor drive key.

BACKGROUND

Large wheels such as, for example, aircraft landing gear wheels require balancing to ensure an equal distribution of mass to prevent, among other things, uneven tire wear and undesirable moment of rotational inertia. In general such wheels are imbalanced because of variations in weight of individual components on the wheels such as inflation valves, safety relief valves, tire pressure sensing valves and heat shields. Other variations in weight may be attributed to geometry variables throughout the wheel and manufacturing capabilities to meet specified tolerances.

Wheel balancing remains a necessity for many large wheels such as aircraft wheels. Present large wheels balance components by adding weights to parts of the wheel to achieve an equal distribution of mass. However, such methods increase the cost of manufacture since they require additional hardware such as, nuts and bolts and machining, to attach such weights. Further, the wheel attachment features for weights add unnecessary weight to the wheel if wheel balancing is not required. Finally, the attachment process for wheel weights may cause structural weakness in various parts of the wheel.

A large wheel brake system may use a multi-disc brake assembly. The brake assembly has a number of rotors attached to the wheel which together rotate around an axle, and a number of stators attached non-rotatably to the brake assembly and interleaved with the rotors. The brake assembly is fixed typically to the landing gear strut. The brake assembly displaces hydraulic pistons against a pressure plate to squeeze together the spinning rotors with the stationary stators and thereby producing torque to decelerate the rotational motion of the wheel.

Rotor drive keys are commonly used to connect the rotors with the wheel. The rotor drive keys are mounted on the interior surface of the wheel well, at a predetermined radial distance from the brake assembly. The rotor drive keys engage the rotors via slots on the circumferences of the rotors. Typically, the rotor drive keys are made from hardened and tempered steel to provide a high tensile strength since during braking, the rotor drive keys must withstand substantial braking torque as the rotors engage the stators.

BRIEF DESCRIPTION OF THE DRAWINGS

FIG. 4A is a perspective top view of a normal rotor drive key used in the example wheel and brake assembly in FIG. 1.

FIG. 4B is a perspective bottom view of a normal rotor drive key used in the example wheel and brake assembly in FIG. 1.

DETAILED DESCRIPTION

Figure 1:
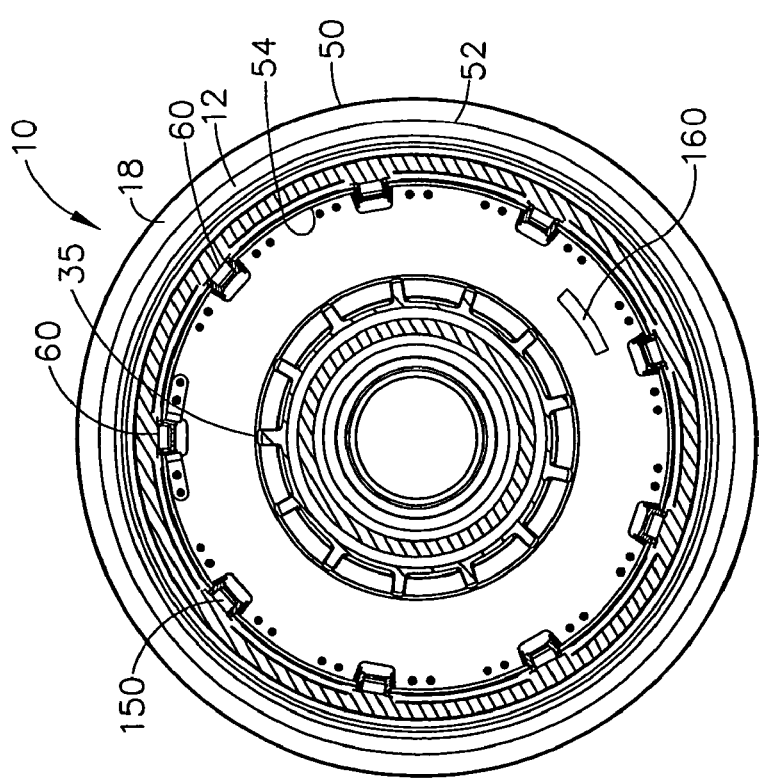
FIG. 1 is a front view of an example wheel and brake assembly having normal rotor drive keys and a weighted rotor drive key to balance the wheel.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

In general, an example balanced wheel rotates around an axle. The wheel includes a rim having an outer surface and an opposite interior surface located circumferentially around the axle. A plurality of rotor drive keys are mounted on the interior surface of the rim. At least one rotor drive key having a different weight than the other rotor drive keys is mounted on the interior surface of the rim.

Another example is a method to balance the rotational inertia of a wheel with a rim having an interior surface rotating around an axle. An undesirable moment of rotational inertia is detected. The location of an abnormal weight on the wheel is determined. A plurality of rotor keys and a rotor key having a different weight than that of any one of the plurality of rotor keys are attached at the interior surface of the wheel to balance the wheel.

Figure 2:
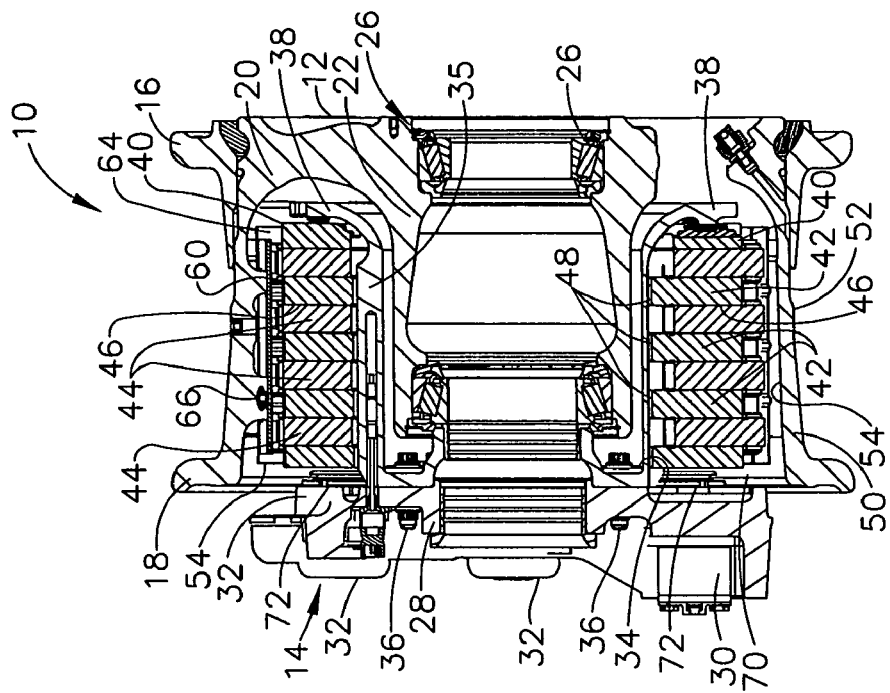
FIG. 2 is a cutaway side view of the example wheel and brake assembly in FIG. 1.
Figure 3:
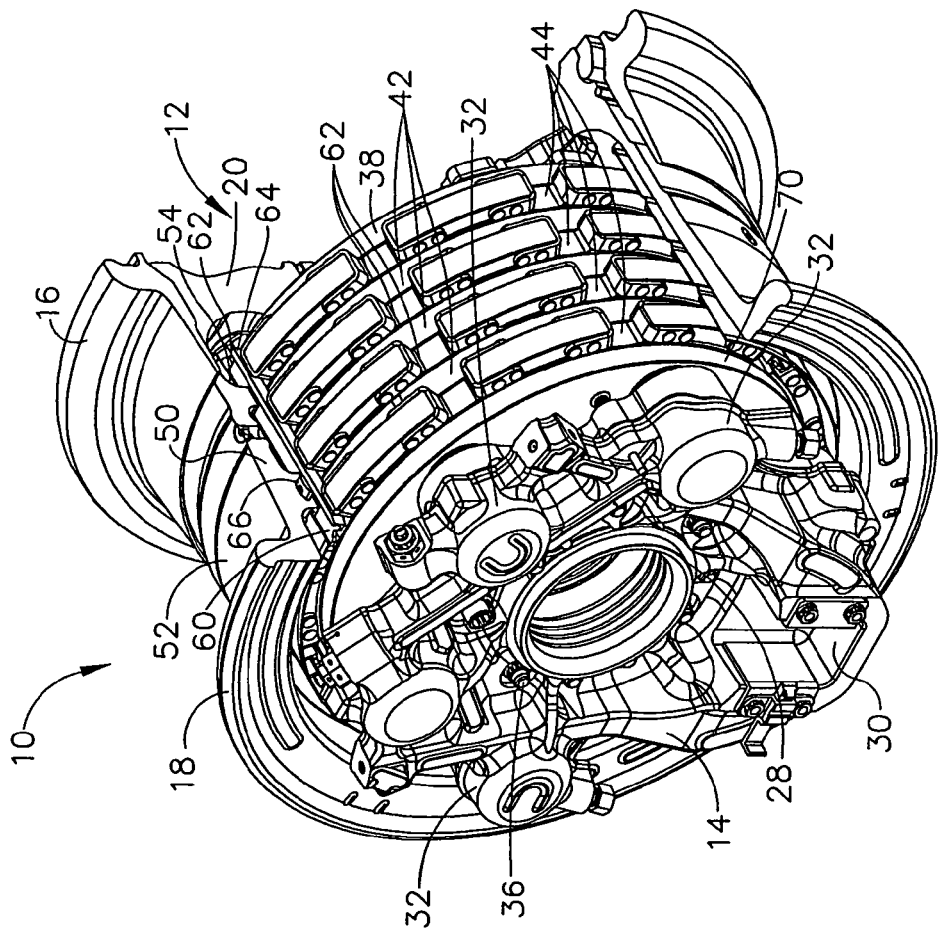
FIG. 3 is a cutaway perspective view of the example wheel and brake assembly in FIG. 1.

Referring to the drawings and in particular FIGS. 1-3, an example wheel and brake assembly 10 is shown. The wheel and brake assembly 10 in this example is for an aircraft wheel, but those of ordinary skill in the art will understand that other types of wheels may be used. The assembly 10 has a wheel 12 and a brake assembly 14. The wheel 12 has an inboard flange 16 and an outboard flange 18 for retaining a tire (not shown). The wheel 12 is provided with integral web portions 20 and a hub portion 22 and is rotatably carried on a fixed axle (not shown) by conventional bearings 26.

In the illustrated example, the brake assembly 14 has a rotatably fixed piston housing 28 secured to a landing gear strut (not shown) via a housing pocket 30 The piston housing 28 includes a series of circumferentially spaced-apart piston chambers 32. An annular torque tube 34 is fixedly secured to the piston housing 28 by a plurality of circumferentially spaced-apart bolts 36, extending through mating openings in the piston housing 28 and the torque tube 34. The torque tube 34 includes a plurality of axially extending splines 35 and an integral annular backing plate 38 having a backing plate brake disc 40 fixedly secured thereto.

In the illustrated example of FIGS. 1-3, a plurality of annular stators or discs 42 are interleaved with a plurality of annular rotors or discs 44. The stators 42 and the rotors 44 are each made of durable materials such as steel or carbon-composite material. The stators 42 have a plurality of circumferentially spaced-apart slots 48 that receive the splines 35 of the torque tube 34. Of course, those of ordinary skill in the art will understand that differing numbers of rotors 44 and stators 42 may be used for the brake assembly 14.

The example wheel 12 has a rim 50 which has an outer surface 52 on which the tire is mounted and an opposite interior surface 54. A plurality of circumferentially spaced-apart rotor drive keys 60 are fixedly secured to the wheel 12 and extend axially relative thereto at a predetermined radius from the torque tube 34. A plurality of circumferentially spaced-apart slots 62 in the radially outermost portion of the rotors 44 receive a plurality of rotor drive keys 60 to provide a non-rotatable connection between the wheel 12 and the rotors 44. The engagement of the rotor drive keys 60 and the slots 62 ensure the rotor discs 44 rotate with the wheel 12.

In the illustrated example, the rotor drive keys 60 are mounted at uniform intervals about the interior surface 54 of the rim 50. One end of each of the rotor drive keys 60 are located at one of a corresponding mating recess 64 in the wheel 12. The rotor drive key 60 is also bored to receive an attachment assembly 66 extending into the interior surface 54 of the rim 50 to secure the rotor drive key 60 in position. Of course, those of ordinary skill in the art will understand that other mechanisms such as rivets, welding, etc. may be employed to secure the rotor drive keys 60 to the interior surface 54 of the rim 50.

The interleaved stators 42 and the rotors 44 are adapted to be compressed between a movable pressure plate 70 and the back plate disc 40. As will be discussed below, the engagement between the pressure plate 70, the rotors 44, the stators 42 and the backing plate disc 40 provide the desired braking deceleration of the wheel 12. The pressure plate 70 is actuated by a plurality of hydraulically activated pistons 72 each of which are slidably carried in an associated chamber 32. The chambers 32 are supplied with pressurized hydraulic fluid via the piston housing 28 communicating with an operator controlled fluid pressure source (not shown). Thus, when the pistons 72 are actuated by supplying pressurized fluid to the chambers 32, the pressure plate 70 is displaced away from the chambers 32 resulting in pressure plate 70 and the stators 42 sliding axially along the splines 56 of the torque tube 34 and engaging the rotors 44 that slide axially along the rotor drive keys 60, resulting in the rotors 44 and stators 42 being squeezed between the pressure plate disc 70 and the backing plate 40. Since the rotors 44 are fixed to the wheel 12 via the rotor drive keys 60, the rotational motion of the wheel 12 is decelerated.

FIGS. 4A & 4B show top and bottom perspective views of a normal rotor drive key 60 which may be used in the wheel 12 in FIGS. 1-3. The rotor drive key 60 includes an outboard end extension 102 which is located within the mating recess 64 at the webbing 20 of the wheel 12 as shown in FIGS. 2-3. The rotor drive key 60 also has an inboard portion 104 and includes a through bolt hole opening 106 through which extends the attachment assembly 66 which attaches the rotor drive key 60 to the interior surface 54 of the wheel 12 as shown in FIG. 6.

Figure 6:
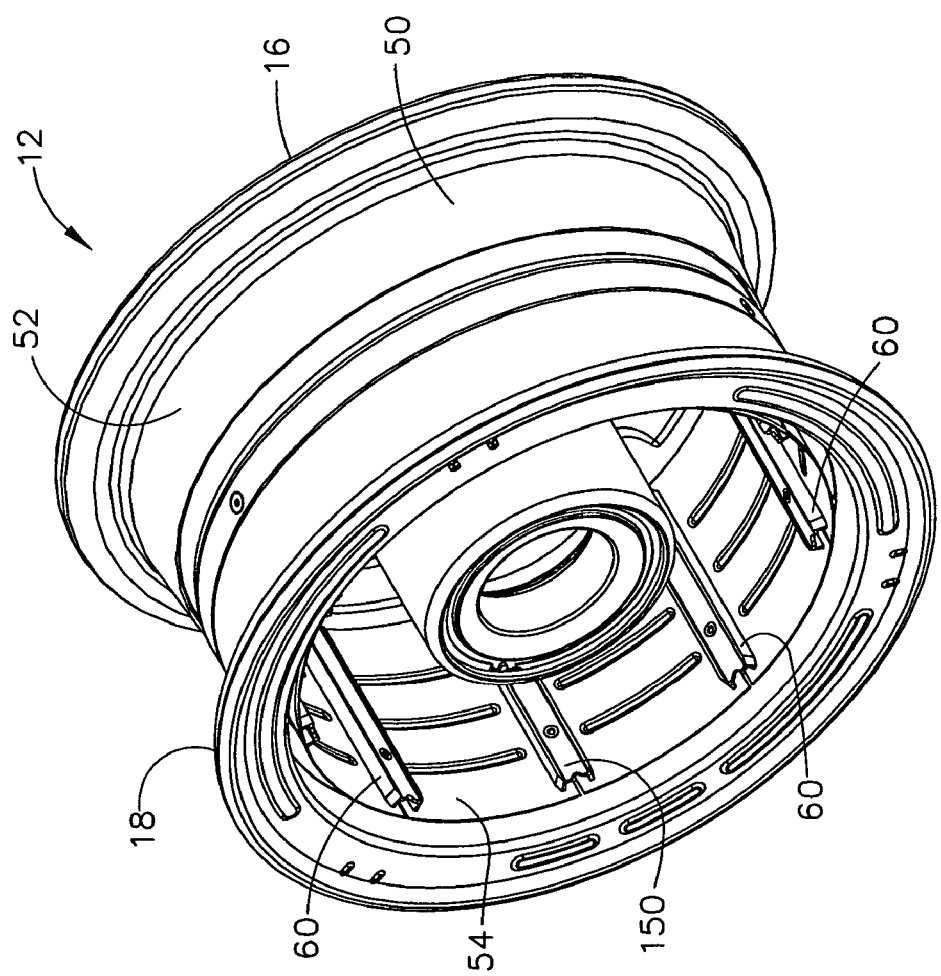
FIG. 6 is a perspective view of the example wheel in FIG. 1 with normal and weighted rotor drive keys.

In the illustrated example, the rotor drive key 60 has side portions 108 having edges which engage the interior surface 54 of the wheel 12 as shown in FIG. 6. The side portions 108 are supported by a top surface 110 which with the side portions 108 are received by the slots 62 located at the periphery of the rotors 44 in FIG. 2. The rotors 44 and stators 42 of the brake assembly 14 are aligned axially along the length of the rotor drive keys 60, such that the slots 62 of the rotors 44 engage the side portions 108 and the top surface 110 of each rotor drive key 60. The side portions 108 form an empty slot 112 at the bottom of the rotor drive key 60.

Figures 5A, 5B:
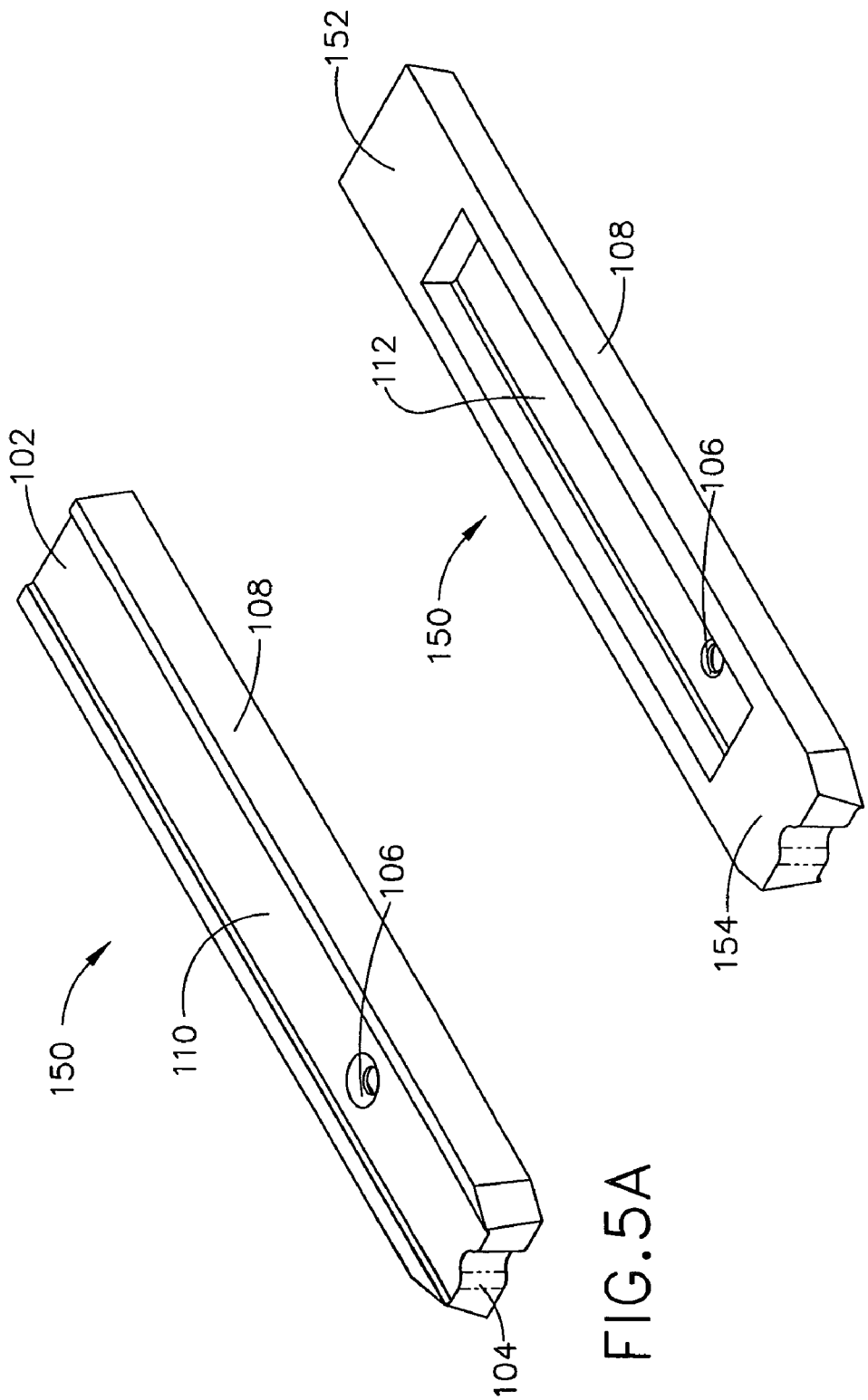
FIG. 5A is a perspective top view of a weighted rotor drive key used in the example wheel and brake assembly in FIG. 1.
FIG. 5B is a perspective bottom view of a weighted rotor drive key used in the example wheel and brake assembly in FIG. 1.

FIGS. 5A & 5B show top and bottom perspective views of an example weighted rotor drive key 150 which may be inserted for any of the example normal rotor drive keys 60 in the wheel 12 shown in FIGS. 1-3. The example weighted rotor drive key 150 shown in FIGS. 5A & B is similar to the normal rotor drive key 60 shown in FIGS. 4A & B with identical elements having identical reference numerals. The weighted rotor drive key 150 in FIG. 6 has a weight 152 which is formed on the inboard portion 104 of the key 150 in the slot 112 and a second weight 154 which is formed on the slot 112 on the outboard portion 102 of the key 150. The weights 152 and 154 cause the weighted rotor drive key 150 in FIG. 5 to be heavier than the example normal rotor drive key 60 in FIGS. 4A & B. In the example weighted rotor drive key 150, the weights 152 and 154 are formed while machining the final shape of the key 150 by retaining the material in these areas. Other methods of forming the weights 152 and 154 may be used, for example, attaching weights to a normal rotor drive key 60 in FIGS. 4A & 4B.

Of course those of ordinary skill in the art will appreciate that the weights 152 and 154 may be located in other areas of the example weighted rotor drive key 150. Moreover, the weighted rotor drive key 150 may be formed in different shapes in order to provide heavier or lighter weight than the normal rotor key 60 in FIGS. 4A & B. Alternatively a single weight may be used. Typically the example normal rotor drive key 60 is fabricated from high strength tensile material such as steel. An identical key shape may be used with denser material such as INCONEL to achieve a weight differential for the weighted rotor drive key 150 relative to the normal rotor drive key 60.

As shown in FIG. 6, the weighted rotor drive key 150 may be inserted on the interior surface 54 of the wheel 12 in order to balance the weight of the wheel 12. Since the weighted rotor drive key 150 has the same mounting mechanisms and dimensions as a normal rotor drive key 60, it may be used in any position occupied by a normal rotor drive key 60.

FIG. 1 shows an example of use of the weighted rotor drive key 150 shown in FIGS. 5A & B. The wheel 12 in FIG. 1 has a number of normal rotor drive keys 60 which are identical to the rotor drive key 60 in FIGS. 4A & 4B. In this example, the wheel 12 is imbalanced at an area 160. The area opposite the area 160 includes one weighted rotor drive key 150 illustrated in FIGS. 5A & B. The weighted rotor drive key 150 serves to balance the extra weight from the area 160 and thus maintain proper moment of rotational inertial of the wheel 12. Of course those of ordinary skill in the art will appreciate that multiple number of weighted drive keys may be used for balancing additional weight. Alternatively, rotor drive keys with different weights may be used to fine tune the balancing of the other rotor drive keys.

In practice, the wheel 12 is balanced on a special rotating machine that determines the location of the imbalance. When the wheel 12 is out of balance, it may exhibit undesirable vibrations at high speeds and uneven tire wear. If no such moment is present, the wheel 12 is considered balanced and normal rotor drive keys such as the rotor drive key 60 are used. If an undesirable rotational moment of inertia is detected, the point at which the imbalance is caused on the wheel 12 is determined. Once the abnormal weight causing the imbalance is determined, preferably, the rotor drive keys at the interior surface 54 of the wheel 12 approximately opposite the abnormal weight are replaced by the appropriate number of weighted rotor keys such as the weighted rotor drive key 150 in FIGS. 5A & 5B. It is desirable to minimize the number of weighted rotor keys used to one weighted rotor key.

Depending on the imbalance, differing numbers of weighted rotor drive keys 150 such as, for example, between one and three weighted rotor keys 150, may be used to balance the wheel. For example, heavier weighting can be achieved using two or three weighted rotor drive keys which can balance approximately two or three times the weight of one weighted rotor drive key. Moreover, if multiple weighted rotor drive keys are used, they may be dispersed around the perimeter of the wheel 12 in any suitable pattern to adjust the weight needed to balance the wheel 12. Thus, a first weighted rotor drive key may be used between two neighboring normal rotor drive keys and a second weighted rotor drive key is installed next to one of the normal rotor drive keys. Using different such configurations, different amounts of weight may be balanced without changing the weight of the individual weighted keys.

Although certain methods and apparatus have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. A balanced wheel to rotate around an axle, the wheel comprising:
    a rim having an outer surface and an opposite interior surface mounted circumferentially around the axle;
    a plurality of rotor drive keys mounted at the interior surface of the rim; and
    at least one rotor drive key having a different weight than the other rotor drive keys.

2. The wheel as defined in claim 1, wherein the at least one rotor drive key is heavier than one of the plurality of rotor drive keys.

3. The wheel as defined in claim 2, wherein the at least one rotor drive key and plurality of rotor drive keys each have an inboard end, an outboard end and a pair of side walls in engagement with the interior surface, wherein the at least one rotor drive key has a weight between the two side walls.

4. The wheel as defined in claim 2 where the at least one rotor drive key is fabricated from a material having a greater density than the plurality of rotor drive keys.

5. The wheel as defined in claim 1, further comprising a second rotor drive key having a different weight than the other rotor drive keys.

6. The wheel as defined in claim 1 wherein the plurality of rotor drive keys are equally spaced apart circumferentially around the interior surface.

7. The wheel as defined in claim 1 further comprising a brake assembly with a rotor having a plurality of slots, each slot engaging a rotor drive key.

8. The wheel as defined in claim 7 further comprising a stator operatively coupled to the axle, the stator moveable to engage the rotor to decelerate rotational movement of the wheel.

9. A method to balance the rotational inertia of a wheel with a rim having an interior surface and rotating around an axle, the method comprising:
    detecting an undesirable moment of rotational inertia;
    determining the location of an abnormal weight on the wheel;
    attaching a plurality of rotor keys at the interior surface of the wheel including a rotor key having a weight different than at least one of the plurality of rotor keys to balance the wheel.

10. The method as defined in claim 9 wherein the plurality of rotor keys and the at least one rotor key having a different weight are mounted at equal circumferential distances from each other.

11. The method as defined in claim 9 wherein the at least one rotor key having a different weight is mounted at the interior surface of the rim approximately opposite the abnormal weight.

12. The method as defined in claim 9 further comprising replacing a second rotor key of the plurality of rotor keys with a second rotor key having a different weight.

13. The method as defined in claim 12 wherein the first and second rotor keys with different weights are adjacent to each other.

14. The method as defined in claim 9, wherein the at least one rotor drive key with a different weight and the plurality of rotor drive keys each have an inboard end, an outboard end and a pair of side walls in engagement with the interior surface, wherein the at least one rotor drive key with a different weight has a weight between the two side walls.

15. The method as defined in claim 9 where the at least one rotor drive key with a different weight is fabricated from a denser material than the plurality of rotor drive keys.

16. The method as defined in claim 9 further comprising mounting a rotor having a plurality of slots, each slot engaging one of the plurality of rotor drive keys.

17. The method as defined in claim 16 further comprising operatively coupling a stator to the axle, the stator moveable to engage the rotor to decelerate rotational movement of the wheel.

\* \* \* \* \*